United States Patent
Chang et al.

(10) Patent No.: US 6,618,519 B2
(45) Date of Patent: Sep. 9, 2003

(54) SWITCH AND VARIABLE OPTICAL ATTENUATOR FOR SINGLE OR ARRAYED OPTICAL CHANNELS

(75) Inventors: Tallis Y. Chang, Northridge, CA (US);
Leo Lam, Calabasas, CA (US);
Graham Martin, Woodland Hills, CA (US)

(73) Assignee: Chromux Technologies, Inc., Chatsworth, CA (US)

( * ) Notice: Subject to any disclaimer, the term of this patent is extended or adjusted under 35 U.S.C. 154(b) by 0 days.

(21) Appl. No.: 09/907,496

(22) Filed: Jul. 16, 2001

(65) Prior Publication Data

US 2003/0012509 A1 Jan. 16, 2003

(51) Int. Cl.[7] ............... G02B 6/35; G02B 6/26
(52) U.S. Cl. ............... 385/18; 385/50; 385/16
(58) Field of Search ............... 385/18, 50, 16, 385/20, 21, 22, 23

(56) References Cited

U.S. PATENT DOCUMENTS

| | | | | |
|---|---|---|---|---|
| 4,626,066 A | * | 12/1986 | Levinson ............... | 385/18 |
| 4,854,658 A | * | 8/1989 | Stanley ............... | 385/18 |
| 5,024,500 A | * | 6/1991 | Stanley et al. ............... | 385/16 |
| 5,361,315 A | * | 11/1994 | Lewis et al. ............... | 385/16 |
| 6,195,478 B1 | * | 2/2001 | Fouquet ............... | 385/16 |
| 6,272,272 B1 | * | 8/2001 | Ford ............... | 385/34 |
| 2002/0028036 A1 | * | 3/2002 | Kato ............... | 385/18 |
| 2002/0048426 A1 | * | 4/2002 | Zhu et al. ............... | 385/18 |
| 2002/0071627 A1 | * | 6/2002 | Smith et al. ............... | 385/15 |
| 2002/0081059 A1 | * | 6/2002 | Takeuchi et al. ............... | 385/18 |
| 2002/0181876 A1 | * | 12/2002 | Chang ............... | 385/47 |

OTHER PUBLICATIONS

Cornel Marxer, et al., "Vertical Mirrors Fabricated by Deep Reactive Ion Etching for Fiber–Optic Switching Applications," Journal of Microelectromechanical Systems, vol. 6, No. 3, pp. 277–285, Sep. 1997.

* cited by examiner

Primary Examiner—John D. Lee
Assistant Examiner—Daniel Valencia
(74) Attorney, Agent, or Firm—Hogan & Hartson, LLP

(57) ABSTRACT

An assembly that could be used either as a switch or an attenuator includes two or more optical channels defined by lithography within a substrate. The two or more optical channels are positioned so that the ends of the optical channels are at or near an edge of the substrate. A moveable MEMS mirror is positioned near the edge of the substrate and the openings, with the face of the mirror positioned to receive an optical signal from one of the optical channels. The mirror can direct an optical signal from one of the optical channels into another of the optical channels. Mirror position can be changed to alter the path of the optical signal and to change the coupling between the optical channels. In this way, the assembly of optical channels within the substrate and the MEMS mirror can act as a switch or as an attenuator.

30 Claims, 18 Drawing Sheets

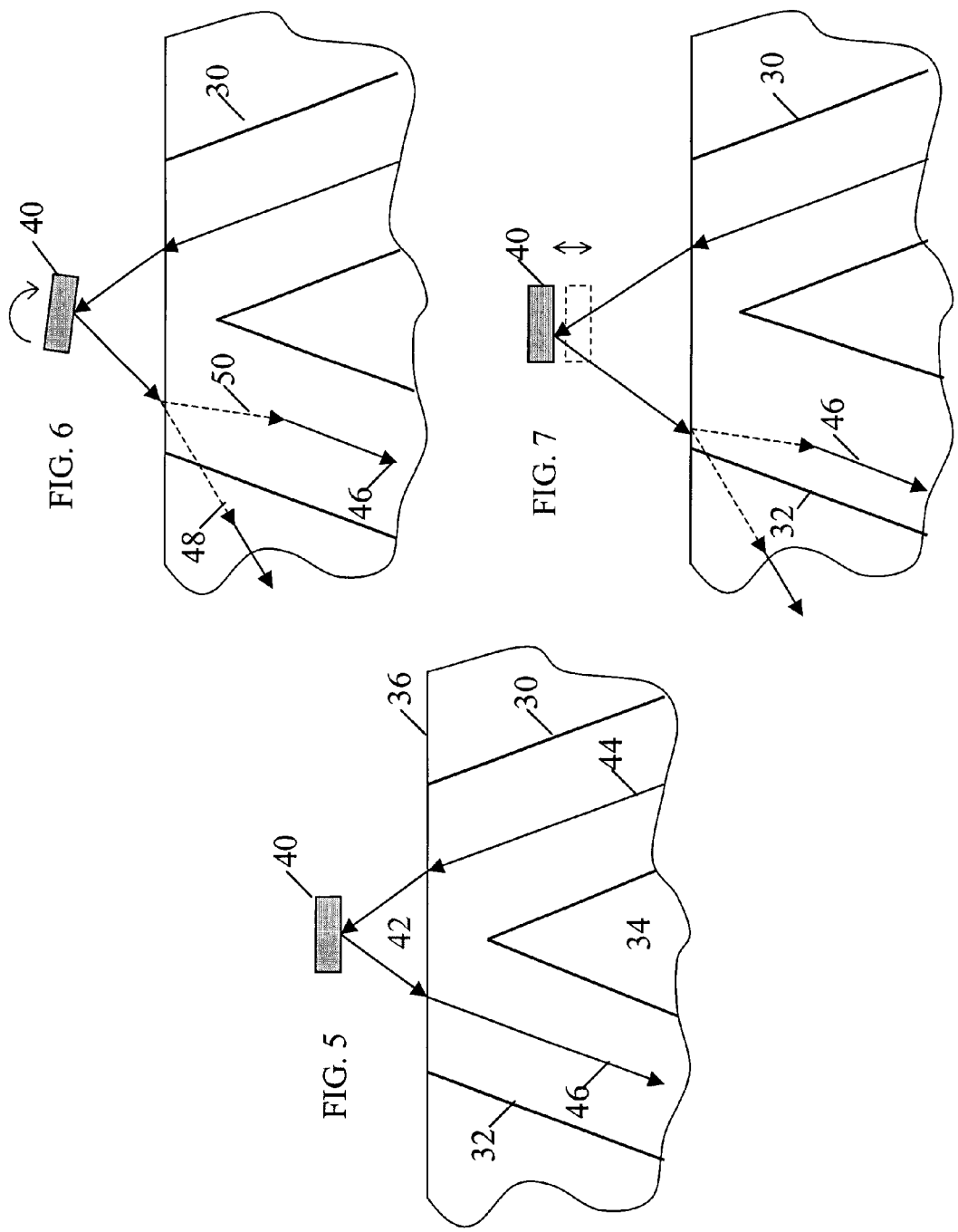

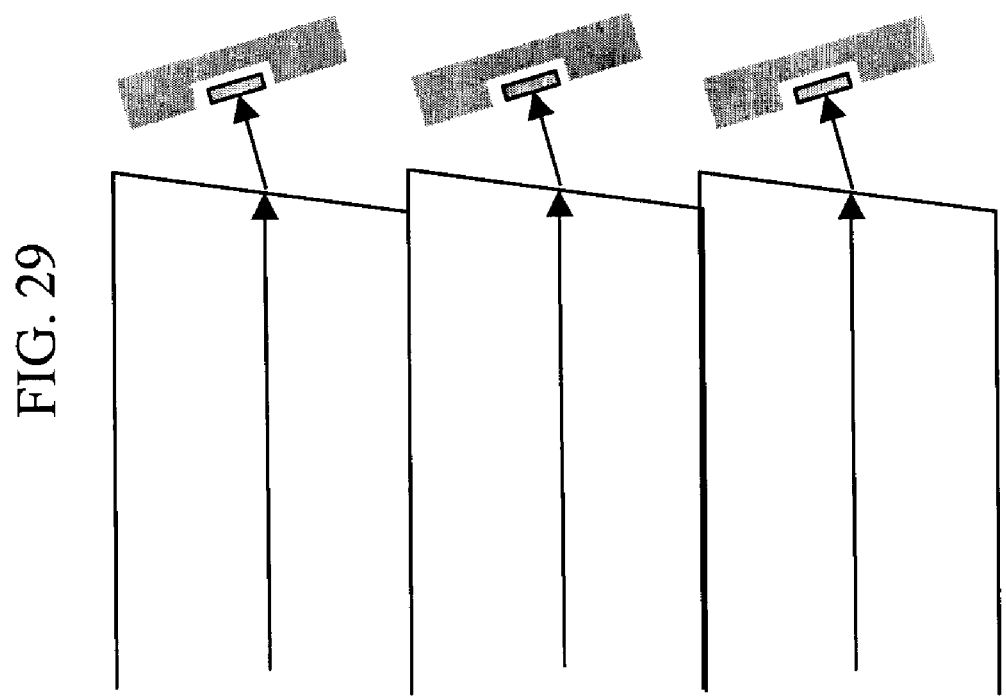

SWITCH AND VARIABLE OPTICAL ATTENUATOR FOR SINGLE OR ARRAYED OPTICAL CHANNELS

BACKGROUND OF THE INVENTION

1. Field of the Invention

The present invention relates to integrated optical components and, in particular, to optical components capable of switching and/or attenuating at least one optical channel and performing add or drop functions for optical channels. Particularly preferred implementations facilitate switching and/or attenuating arrays of optical channels.

2. Description of the Related Art

Optical networks are used for wide area and long distance communication, including for the backbone of the Internet. Demand for additional bandwidth in short haul (i.e., metro) and long haul applications continues to grow and a variety of different strategies have been adopted to make optical networks less expensive and more flexible. Optical networks use a variety of components, including add/drop modules, attenuators and optical switches. Generally these components are bulky, expensive and have low levels of integration. The lack of adequate, reliable and cost-effective components has retarded the implementation of optical networks and has limited optical networks to very high traffic systems.

Conventional optical switching proceeds by various methods that include completely mechanical switching, polarization controlled switching, interferometric switching and MEMS switching.

Completely mechanical switching physically moves an input channel and/or an output channel (usually in the form of an optical fiber) with a microelectromagnetic switch (FIG. 1) to alter the state of a switch or to change the coupling between channels. Referring to FIG. 1, a first switching state is indicated at 10 in which fibers representing input channels 1 and 2 are coupled to corresponding fibers representing output channels 1 and 2. The assembly can be switched between the state indicated at 10 in which input 1 is coupled to output 1 and input 2 is coupled to output 2 to either of the states indicated by 12 and 14. State 12 couples input 1 to output 2 and input 2 to output 1 and illustrates the use of the FIG. 1 assembly as a 2×2 switch. Switching is accomplished, for example, by rotating the two input fibers using a microelectromagnetic element. State 14 couples input 1 to output 2 and does not connect output 1 or input 2 to another channel. This 2×2 add-drop switching is accomplished, for example, by linearly translating the two input fibers using a similar microelectromagnetic element. The physical movements required to alter the states or coupling make the switches schematically illustrated in FIG. 1 slow and preclude scaling the switches into an array.

A second type of switching is polarization controlled switching and is illustrated in FIG. 2. Polarization controlled switching uses a polarization rotator whose light transmission is attenuated if followed by a polarizing filter. Polarization controlled switching is polarization dependent. It is preferable for any optical switch to accept light input having an arbitrary polarization. Consequently, polarization controlled switches include components to make the switch insensitive to the polarization of the input light.

A polarization controlled variable optical attenuator (VOA) switch that is insensitive to input light polarization is shown in FIG. 2. Input light 16 passes through a polarizing beam-splitter 18 that separates the input light into two non-overlapping beams of orthogonal polarization light. Each of the separated beams passes through a polarization controlled light switch 20, 22 adapted to the polarization of the separated beams to apply polarization controlled switching to each beam. The beams are provided to another polarizing beam splitter 24 that combines the two beams into a single output. The complexity required to eliminate the polarization sensitivity adds expense. In addition, the polarizing beam splitter and combiner are usually bulk components that are not readily integrated into an array.

FIG. 3 shows an interferometric switch that uses a Mach-Zehnder type interferometer. The illustrated interferometric switch is usually formed as a planar waveguide circuit and includes 2×2 couplers on either end of a pair of interferometric arms. One of the arms has an optical element that is switched thermally or electro-optically to vary the phase delay between the two arms of the interferometer. The 2×2 couplers on both ends of the interferometer arms are precisely fabricated to ensure an exact 50/50% coupling, since any imbalance between the arms manifests itself as an insertion loss as well as a poor extinction ratio or crosstalk. Typical interferometric switches have an extinction ratio or crosstalk of worse than 20 dB. It is difficult to manufacture such interferometric switches economically, especially scaling such switches into an array with many channels.

Another type of optical switch uses microelectromechanical (MEMS) structures to switch optical channels. A common MEMS 2×2 switch is illustrated in FIG. 4, where the input and output channels are optical fibers. A more specific description of this 2×2 switch formed on a silicon on insulator (SOI) substrate is shown in C. Marxer, et al., "Vertical Mirrors Fabricated by Deep Reactive Ion Etching for Fiber-Optic Switching Applications," *IEEE/ASME Journal of Microelectromechanical Systems*, Vol. 6, No. 3, pp. September 1997. Referring to FIG. 4, a MEMS mirror 26 is shown in a first switch position in which input 1 is coupled to output 1 and input 2 is coupled to output 2. In the second switch position indicated by MEMS mirror 28 withdrawn from between the optical fibers, input 1 is coupled to output 2 and input 2 is coupled to output 1.

The MEMS switch system of FIG. 4 is limited in that the diameter of the optical fibers prevents the fibers from being placed close to each other and to the MEMS switching blade. If the fiber tips are not positioned closely together, the light from an input fiber diverges unacceptably before it is captured by the output fiber, resulting in a high insertion loss. It is difficult to taper the ends of fibers consistently. Variations in the taper of the fiber makes the dispersion and the coupling between fibers unpredictable. Another limitation of the illustrated system is that the input and output channels and MEMS structures are oriented in various directions, making it difficult to scale the switch into a linear array on a single wafer.

Single mode optical channels in either optical fibers or planar channels on substrates are usually small, on the order of several micrometers, so that precise positional alignment is required to couple light into and out of such channels. Also, light emitted from such waveguides diverges in a few tens of micrometers so that the working distance between the emitting waveguide and the receiving waveguide is short. The working distance between emitting and receiving channels often needs to be extended to provide sufficient room for switching components between the channels. The conventional method to extend the working distance for switching components is to expand the light beam from the emitting fiber followed by collimating the expanded light with lenses. This not only adds to the complexity and cost of the system but also aggravates the receiving channel's susceptibility to angular misalignment. In general, the collimator of the receiving channel is precisely aligned positionally and angularly to both the switching mirror and the emitting channel's collimator. In an array of switches, the tight position and angular tolerances are maintained across the array. Also the pitches of the waveguide and mirror arrays have to be matched to a micrometer or better.

SUMMARY OF THE PREFERRED EMBODIMENTS

An aspect of the present invention provides an optical component including a waveguide substrate having an edge and having first and second waveguides formed within the waveguide substrate, the first waveguide having a first end on the edge and the second waveguide having a second end on the same edge. A mirror is positioned adjacent to the edge of the waveguide substrate to receive an optical signal from the first end of the first waveguide and direct the optical signal to the second end of the second waveguide in at least one position of the mirror. The mirror is movable to alter the amount of coupling between the first waveguide and the second waveguide.

Another aspect of the present invention provides an optical component including a waveguide substrate having an edge and having first, second and third planar waveguides extending within the waveguide substrate, each of the first, second and third waveguides having an optical path extending through the edge of the waveguide. A mirror is positioned adjacent to the edge of the waveguide substrate. The mirror is spaced from the edge of waveguide substrate, the mirror receiving an optical signal output from the first waveguide and directing the optical signal to the second waveguide in at least a first position of the mirror, the mirror receiving the optical signal and directing the optical signal to the third waveguide in at least a second position of the mirror. The mirror is movable to couple the first waveguide either to the second waveguide or to the third waveguide.

Still another optical component includes a waveguide substrate having an edge and having first, second, third and fourth planar waveguides extending within the waveguide substrate. Each of the first, second, third and fourth waveguides has an optical path extending through the edge of the waveguide. A mirror is positioned adjacent to the edge of the waveguide substrate. The mirror is spaced from the edge of waveguide substrate and receives a first optical signal output from the first waveguide and directs the first optical signal to the third waveguide in at least a first position of the mirror. The mirror receives the first optical signal and directs the first optical signal to the fourth waveguide in at least a second position of the mirror. The mirror receives a second optical signal output from the second waveguide and directs the second optical signal to the third waveguide in at least the second position of the mirror. The mirror is movable to couple the first optical signal to the third waveguide or to the fourth waveguide.

Yet another optical component includes a waveguide substrate having an edge and having first, second and third planar waveguides extending in parallel within the waveguide substrate, each of the first, second and third waveguides having an optical path extending through the edge of the waveguide. A lens is positioned within the optical path of each of the first, second and third planar waveguides. A mirror is positioned adjacent to the edge of the waveguide substrate, the mirror spaced from the edge of waveguide substrate and receiving an optical signal output from the first waveguide and directing the optical signal to the second waveguide in at least a first position of the mirror. The mirror receives the optical signal and directs the optical signal to the third waveguide in at least a second position of the mirror. The mirror is movable to couple the first waveguide either to the second waveguide or to the third waveguide.

BRIEF DESCRIPTION OF THE DRAWING

Aspects and various advantages of the present invention are described below with reference to the various views of the drawings, which form a part of this disclosure.

FIG. 5 shows a variable optical attenuator/switch in the full on state.

FIG. 6 shows a variable optical attenuator/switch in an attenuated state achieved with mirror tilt.

FIG. 7 shows a variable optical attenuator/switch in an attenuated state achieved with mirror translation.

FIG. 29 illustrates a layered assembly of a number of linear arrayed switches.

DETAILED DESCRIPTION OF THE PREFERRED EMBODIMENTS

Figure 1:
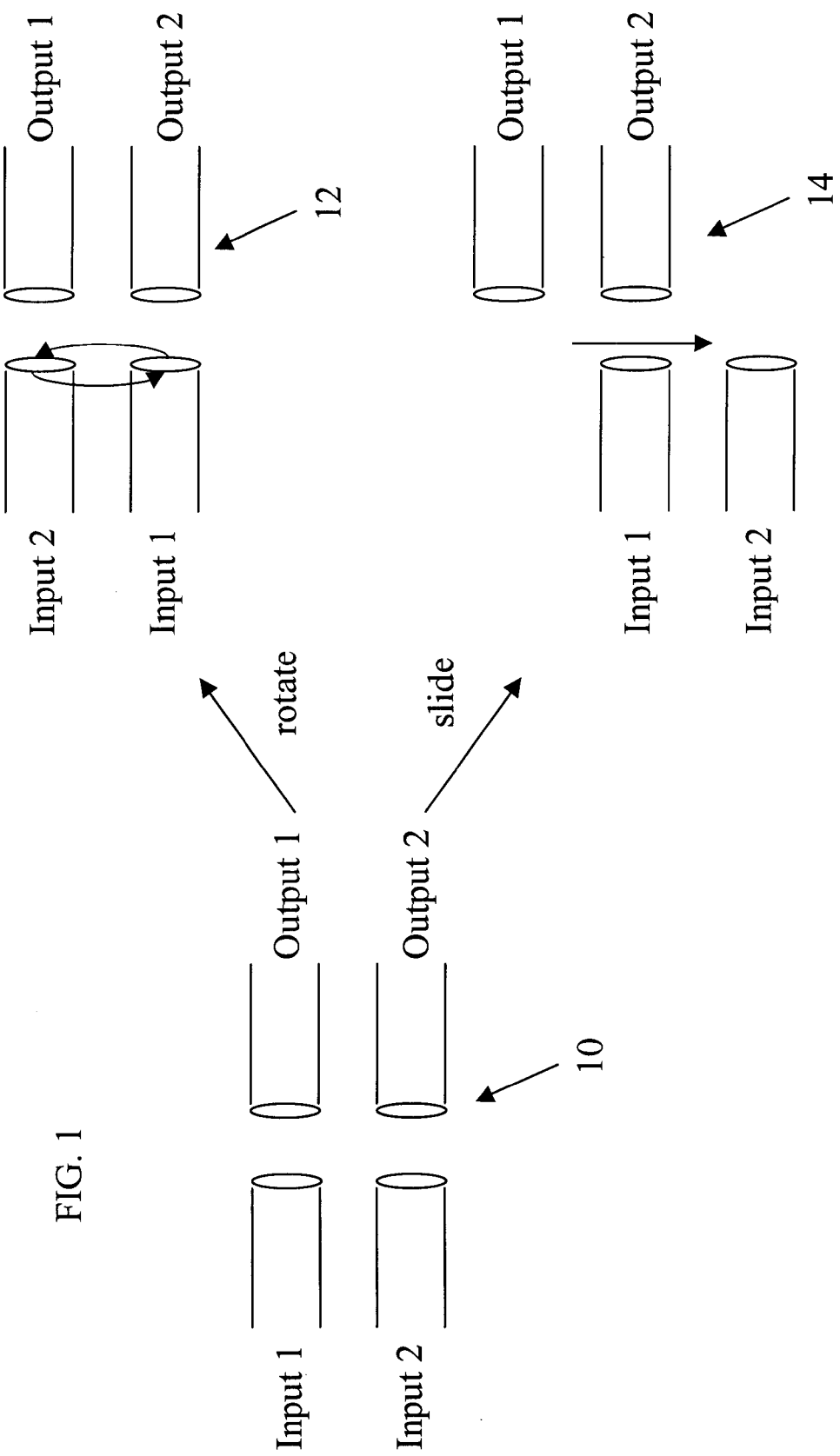
FIG. 1 shows schematically aspects of a fully mechanical 2×2 optical switch.
Figure 2:
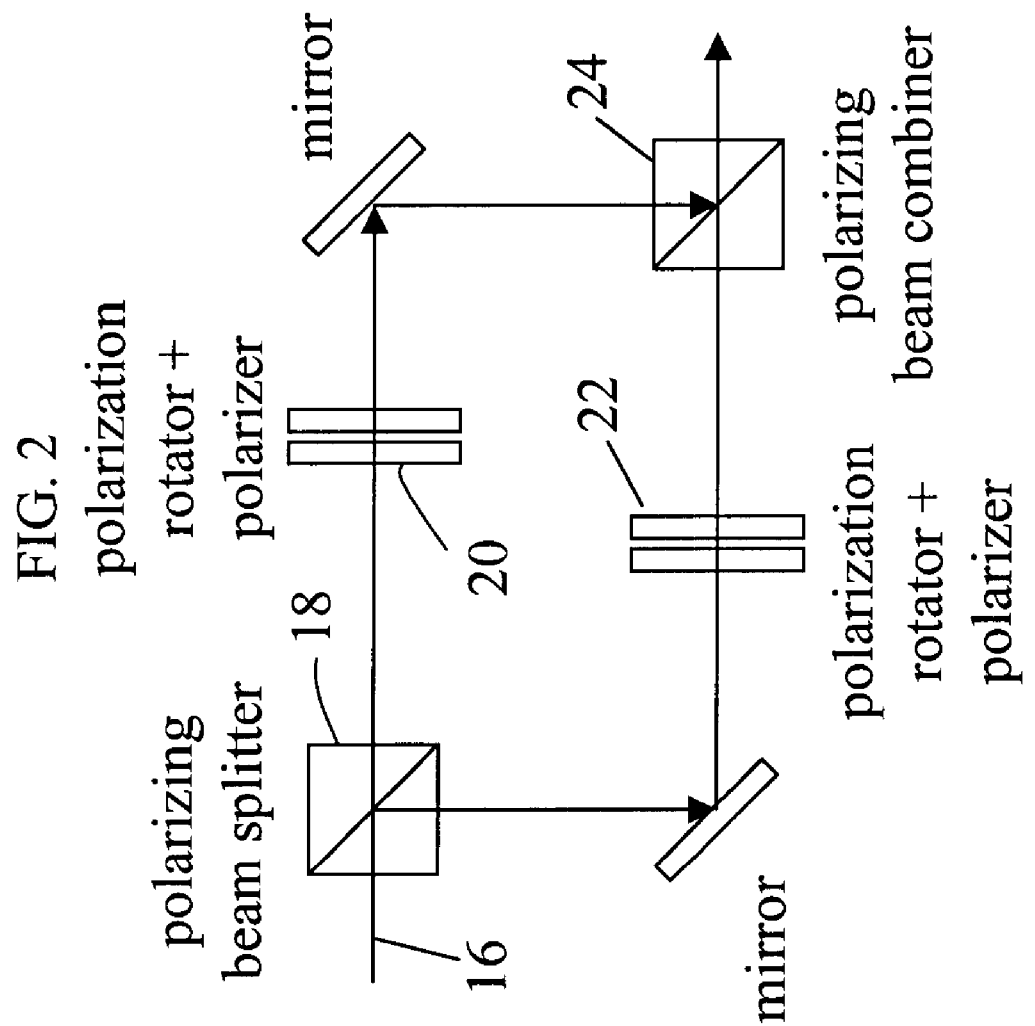
FIG. 2 shows an example of a variable optical attenuator based on polarization control.
Figure 3:
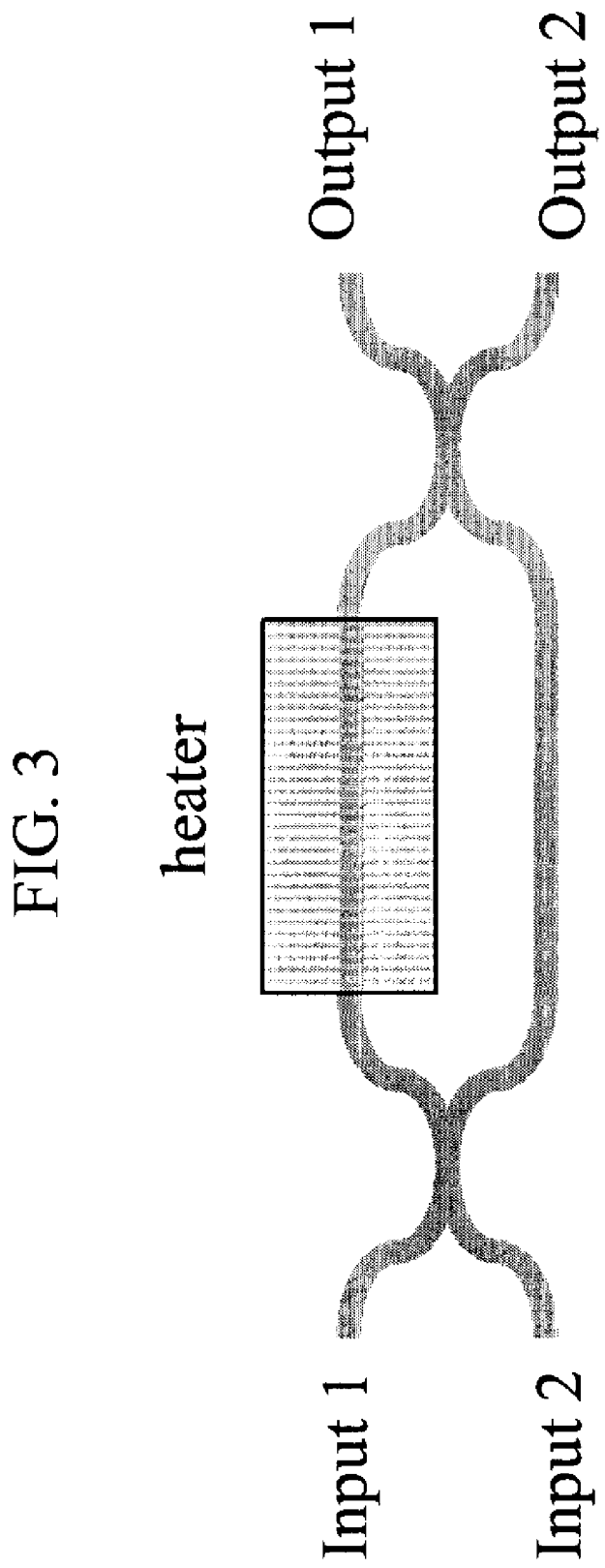
FIG. 3 shows an example of a 2×2 switch based on thermo-optic switching of a Mach-Zehnder interferometer.
Figure 4:
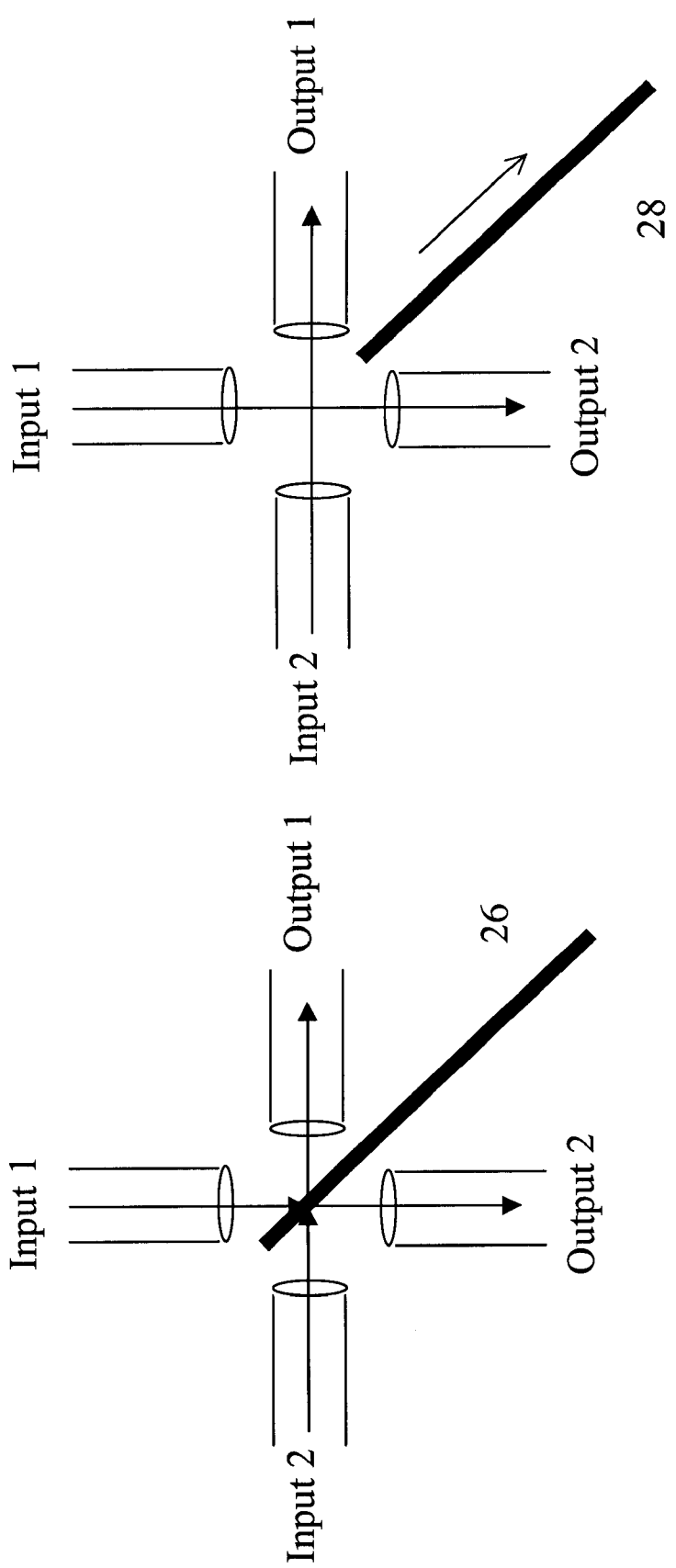
FIG. 4 shows an example of a conventional 2×2 MEMS switch.

An assembly that could be used either as a switch or an attenuator includes two or more optical channels defined within a substrate. The two or more optical channels are positioned so that the ends of the optical channels are at or near an edge of the substrate. A moveable mirror is positioned near the edge of the substrate and the ends, with the face of the mirror positioned to receive an optical signal from one of the optical channels. The mirror can direct an optical signal from one of the optical channels into another of the optical channels. The position of the mirror can be changed to alter the path of the optical signal and to change the coupling between the optical channels. In this way, the assembly of optical channels within the substrate and the mirror can act as a switch or as an attenuator.

When used as a switch, it may be preferable for the mirror to have two predetermined positions for two different switching states. When used as an attenuator, it is preferable that the mirror position be adjustable and most often continuously adjustable over a range or rotational or translational positions.

A preferred implementation of this assembly uses photolithography to define the optical channels and a microelectromechanical (MEM) structure as the mirror. For example, the substrate for the optical channels may be silicon and the optical channels could be planar waveguides defined on the silicon substrate. Generally such planar waveguides are oxides of silicon, but could be made of other materials manufactured using known techniques. The mirror can be a MEMS structure formed by using conventional semiconductor processing techniques to form mechanical structures and electrodes to position those mechanical structures using electrical signals. A particularly advantageous aspect of this strategy is that the structures can be formed using techniques suitable for mass production, with relatively little post processing assembly. This increases the precision of the equipment and reduces the cost of manufacturing the assembly.

Many of these switch or attenuator assemblies can be combined on a single substrate and a single MEMS mirror assembly. This facilitates scaling this architecture to a multi-channel, linear array of switches. Further scaling is accomplished by stacking these planar linear switch arrays.

In preferred implementations, the positional and angular relations between the various input and output channels of an optical switch or attenuator system are defined precisely by forming the planar waveguides on a substrate using photolithography. The MEMS mirror array preferably also is formed by etching with precision masking defined by photolithography. This reduces the normally complex alignment procedure of input and output waveguides with mirrors to a simple butt-joining of the waveguide wafer edge via a spacer to the surface of a MEMS substrate on which an array of mirrors is formed. That is, the position of the waveguides within the substrate is established reliably by photolithography and the mirrors of the MEMS array are formed in precise registration to the position of the waveguides. Assembly is accomplished by positioning the mirror array with respect to the edge of the waveguide substrate, with that assembly accomplishing the alignment of the waveguides and the mirrors.

The spacing between the mirrors and the openings of the waveguides is selected to be small and the sizes of the mirrors and the extents of mirror movement are selected to be appropriate to that spacing. This allows the optical signal from an input waveguide to be redirected by a mirror and coupled efficiently back into a receiving waveguide. Such an implementation eliminates the need for collimating the light between the input and output channels. Intervening lenses or other optics are unnecessary. In this configuration, most of the light can be captured with minimal insertion loss, despite the divergence of the light beam from the input to output channels. Moreover, the precise alignment and close proximity of the various parts can be maintained between different switching positions. For the operation mode in which the switch is used solely or simultaneously as an attenuator, the switching position, that is the mirror angle or sliding position, may be continuously adjusted to continuously vary the coupling of light between an input and output channel.

Different mechanisms can be used for switching. One implementation of the switch mechanism adjusts the tilt angle of a MEMS mirror. Another switch mechanism adjusts the separation of the MEMS mirror from the edge of the waveguide substrate.

The switch can be configured as a variable optical attenuator, a 1×2 switch or an add-drop 2×2 switch. The switch architecture can be generalized into higher input and output channel counts as long as allowed by positional and angular space. Another implementation scales the single switch or attenuator into a linear array by duplicating the waveguide and MEMS mirror pattern on their respective substrates. Stacking two or more linear array switches (waveguide wafer edge-joined to a mirror strip) may further extend the scaling of the array on top of each other. The substrate including the switches may further include waveguide multiplex/demultiplex structures, e.g., arrayed waveguide gratings (AWG) to be integrated with this array switching structure on the same substrate. Such arrayed waveguide gratings are known in the art and the manufacture of such arrayed waveguide structures is compatible with the manufacture of the planar waveguide structures discussed above.

Another preferred aspect routes the waveguides in the array in a manner to concentrate the waveguide spacing at the edge of the substrate near the MEMS mirror array, while providing a greater spacing between waveguides to accommodate the interface with V-grooved fiber arrays. This allows the spacing or pitch of the MEMS mirror array to be smaller than the conventional 250 micrometer pitch of V-grooved fibers. The waveguides may also be routed on the substrate to group the input, output, add and drop channels separately. This allows the grouped channels, properly pitched, to be interfaced directly with the input, output, add and drop fiber or other arrays separately. This implementation usually calls for numerous crossings of the waveguides, which is undesirable in many instances because of signal loss and crosstalk between waveguide channels. However, loss and crosstalk can be kept low by keeping the angles of intersection between crossing waveguides to be above about 20 degrees.

Tapping branches may be added to the input and output waveguides so that both the input and output intensities can be monitored. In conjunction with operation of the switch as a variable attenuator, monitoring the intensities of the light in the input and output channels allows the intensity of light output to be externally controlled within a servo loop, if desired.

The various embodiments described above could be used singly or jointly in different combinations.

FIG. 5 shows a basic implementation of a variable optical attenuator or switch. Input waveguide 30 and output waveguide 32 on substrate wafer 34 intersect each other near the wafer edge 36. A MEMS mirror 40 is positioned at a small air gap distance 42 from the wafer edge 36. The positions and angles of the waveguides 30, 32 and mirror 40 are precisely defined by photolithography. This allows input light beam 44 in input waveguide 30 to refract at wafer edge 36, reflect from mirror 40, refract again at wafer edge 36 and then to be captured to the fullest extent as the output beam 46 by output waveguide 32. Since the beam spot is usually about 10 µm wide, the mirror can be as small as 30 µm in diameter. Hence the air gap 42 can be as low as 5 µm and yet allow a mirror tilt angle of 5/15 radian or about 20 degrees. With such a small air gap, the beam diverges very little before it couples back into the output waveguide 32. For longer working distances, the output waveguide could be flared gradually to couple better with a wider reflected beam with adiabatic transition to its normal narrow width.

The angle between the input and output waveguides 30, 32 is chosen to be small to reduce polarization dependent loss (PDL) between the s-polarization and p-polarization states and yet large enough to ensure minimal crosstalk, in this case actually return loss, between the two channels. This can be attained, depending on the numerical aperture of the waveguides, with an intersecting angle of larger than 20 degrees. Further reduction of insertion loss could be obtained by anti-reflection coating the wafer edge 36.

To attenuate the beam between the input and output, the mirror 40 is tilted, as depicted in FIG. 6, so that the reflected beam hits the output waveguide with a small angle and position mismatch. The light energy in the output waveguide separates into two parts, one part 48 escaping from the output waveguide and another part 50 trapped within the output waveguide as the attenuated output beam 46. It takes about 7 degrees of mirror tilt, depending on the waveguide numerical aperture, to effect 15 dB attenuation. This scale factor should be large enough to allow enough dynamic range of attenuation and yet small enough for adequate resolution. The reflected beam preferably is tilted away from the input channel 30 so that the return loss is not worsened with attenuation. An alternative mechanism for the switch is moving the mirror 40 backwards, as depicted in FIG. 7 resulting in a position mismatch of the reflected beam with the output waveguide 32 and again attenuating the output beam 46. Again the mirror 40 should be moved backward instead of forward so that the reflected beam is moved away from the input channel 30 with attenuation.

Figure 8:
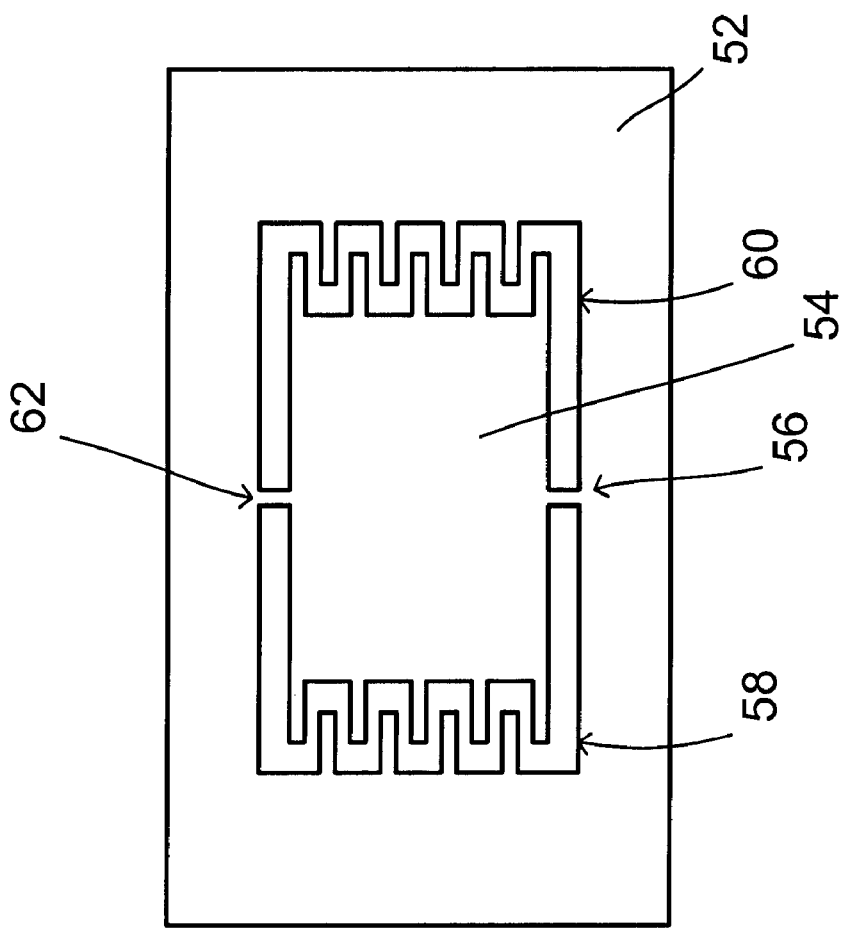
FIG. 8 illustrates schematically an exemplary MEMS mirror configuration.

FIG. 8 illustrates schematically an aspect of a mirror that might be used in a preferred implementation of an array of mirrors. Only a single one of the mirrors is shown. Generally all of the mirrors are formed on a common surface of a single crystal of silicon using microelectromechanical machining technology. More specifically, preferred implementations of the mirror array are formed on a single crystal of silicon using the micromachining techniques described in U.S. Pat. No. 6,150,275, which patent is incorporated by reference in its entirety. Other machining techniques are known and might also be used. Additional aspects of a preferred manufacturing process are described in pending U.S. patent application Ser. No. 09/771,169, filed Jan. 26, 2001 and entitled "Micro-Machined Silicon ON-OFF Fiber Optic Switching System," which patent application is hereby incorporated by reference for all of its teachings on the manufacture of silicon microelectromechanical structures.

Referring now to FIG. 8, the mirror is formed on a silicon substrate 52 and, in the illustrated example, has a generally rectangular planar silicon mirror surface 54. Generally a metal such as aluminum or gold is deposited to a desirable thickness on the face of the mirror to provide a high level of reflectivity. The mirror is separated from the silicon substrate on the backside so that the mirror surface is attached to the substrate only by hinges 56 and 62 on either side of the mirror. These hinges are simple silicon beams that provide a torsional restoring force and support for the mirror surface 54. These silicon beams define the rotational axis for this mirror. Most preferably, each of the mirrors of the array has a rotational axis parallel to the other mirrors in the array so that the rotational axes are coplanar in three-dimensional space. More complicated hinges can be defined, generally for lower levels of restoring forces and greater levels of rotational movement. For such complicated hinges, the rotational axes of the individual mirrors are still preferably aligned for the simplicity such alignment brings to assembly of the rest of the module.

The mirror surface 54 preferably is separated from the underlying silicon substrate 52 by a substantial separation to allow considerable rotational movement to the mirror. Movement is accomplished by providing appropriate DC signals to the appropriate comb electrodes 58, 60 on either end of the mirror surface 54. The comb electrodes are shown in greatly simplified form in this illustration, but are a familiar structure in the MEMS art. To effect rotation of the mirror face, the comb electrodes of the substrate are generally offset lower than the corresponding portion of the comb electrodes of the mirror surface, although such a configuration is not always necessary. Opposite polarity charging arrangements, i.e., repelling charges on one set of comb electrodes and attracting charges on the other set of comb electrodes, may be used to apply greater force.

In some implementations a translational mirror assembly is used instead of the rotational mirror assembly discussed above with reference to FIG. 8. Such mirrors and their manufacture are known in the art and so are not described in further detail here.

Figure 9:
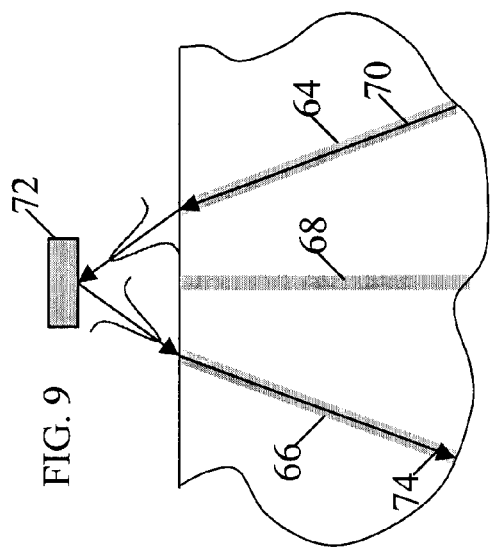
FIG. 9 shows a 1×2 mirror-tilt switch in a first state.
Figure 10:
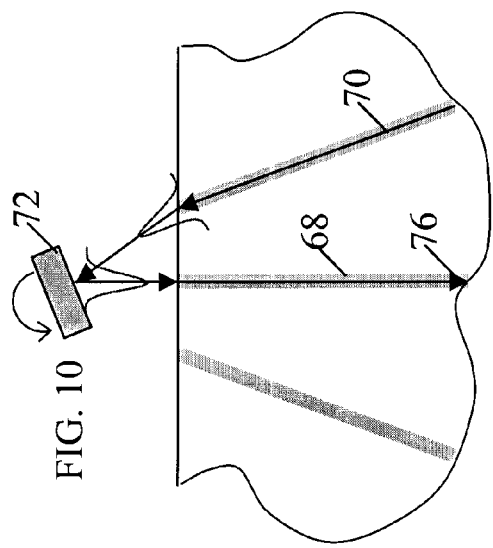
FIG. 10 shows a 1×2 mirror-tilt switch in a second state.

FIG. 9 shows a 1×2 switch in a pass through or unswitched state, with the input, first output and second output waveguides 64, 66 and 68 respectively drawn as wide shaded bands for clarity. The input beam 70 in input waveguide 64 reflects off mirror 72 and is directed into and couples to the first output waveguide 66 as first output beam 74. The switched state is depicted in FIG. 10 where the mirror 72 is tilted to direct the input beam 70 into the second output waveguide 68 as the second output beam 76. Generally one of the switching positions will be the position the mirror is in with no applied charge or other forces. In certain embodiments, the switch mechanism has a latch to hold it in the other of the switching states. In other embodiments, the switch mechanism is held in the other of its respective positions by an electrical signal.

Figure 11:
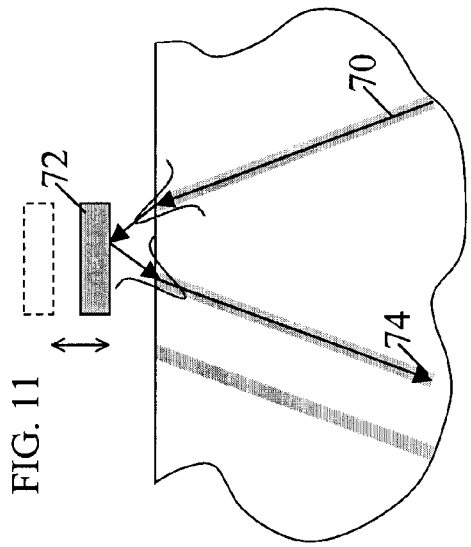
FIG. 11 shows a 1×2 mirror-translation switch in a first state.
Figure 12:
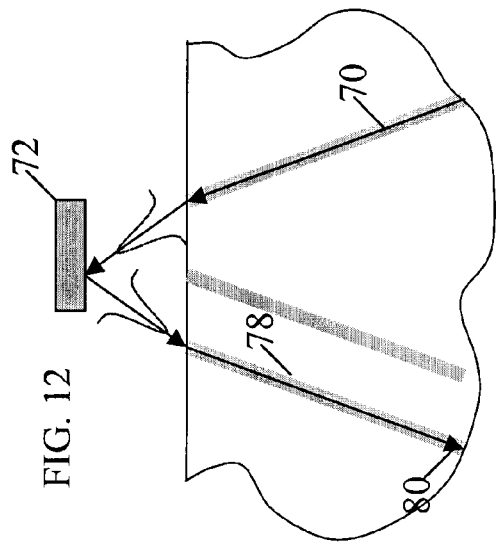
FIG. 12 shows a 1×2 mirror-translation switch in a second state.

Alternately, the switching mechanism can use a translational movement instead of tilting the mirror 72 through an angle. The translational switching mechanism selectively couples light from input waveguide 64 to one of two substantially parallel waveguides 74 and 78 as depicted in the unswitched state in FIG. 11 and in the switched state in FIG. 12. The second output beam 80 exits along the second waveguide 78. The operation of this 1×2 switch is similar to that of the variable optical attenuator discussed earlier, so that the choice of angles and air gaps to minimize insertion and return loss discussed there applies here as well. Also the outputs could be attenuated by tilting or moving the mirror 72 to reduce the coupling of the reflected beam into the output waveguides. Again, the direction of mirror tilt or translation for attenuation preferably moves the reflected beam away from nearby channels to minimize crosstalk.

Figure 13:
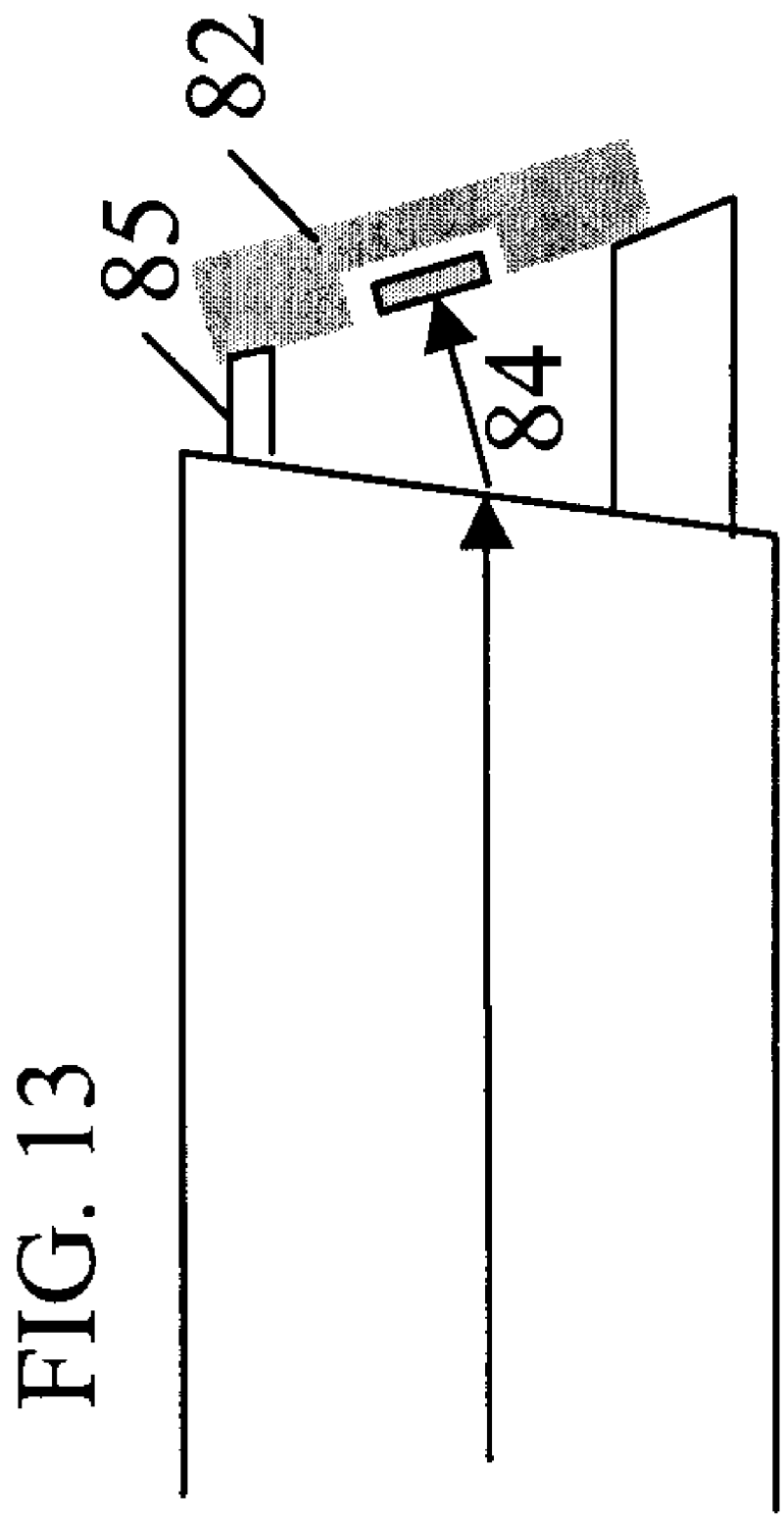
FIG. 13 shows an edge view of the switch.
Figure 14:
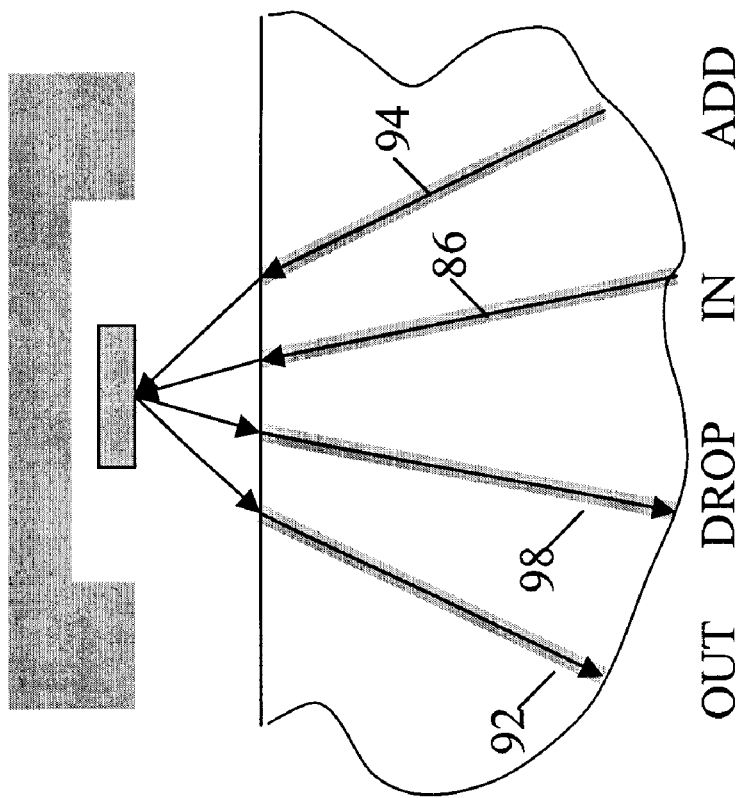
FIG. 14 shows an add-drop switch with a tilting mirror mechanism with the mirror in a pass-through state.

All the beams in FIGS. 9 to 12 could be reversed in direction so that either 1×2 switch could be operated as a 2×1 switch. In this case, waveguide 68 in FIG. 10 becomes the second input waveguide and is shown perpendicular to the wafer edge. This would not produce a retro-reflection problem in the switched state (FIG. 10 with light reversed in direction) if the wafer edge is angled in the orthogonal direction as depicted in FIG. 13. However, there could be substantial retroreflection in the unswitched state (FIG. 9 with reversed light) from the mirror if input light is present in waveguide 68. To prevent this, waveguide 68 is preferably made oblique instead of perpendicular to the substrate edge. FIG. 13 also shows one way of joining the MEMS mirror wafer 82 to the wafer edge 84 with a spacer 85 that controls the air gap and the vertical tilt angle.

Figure 15:
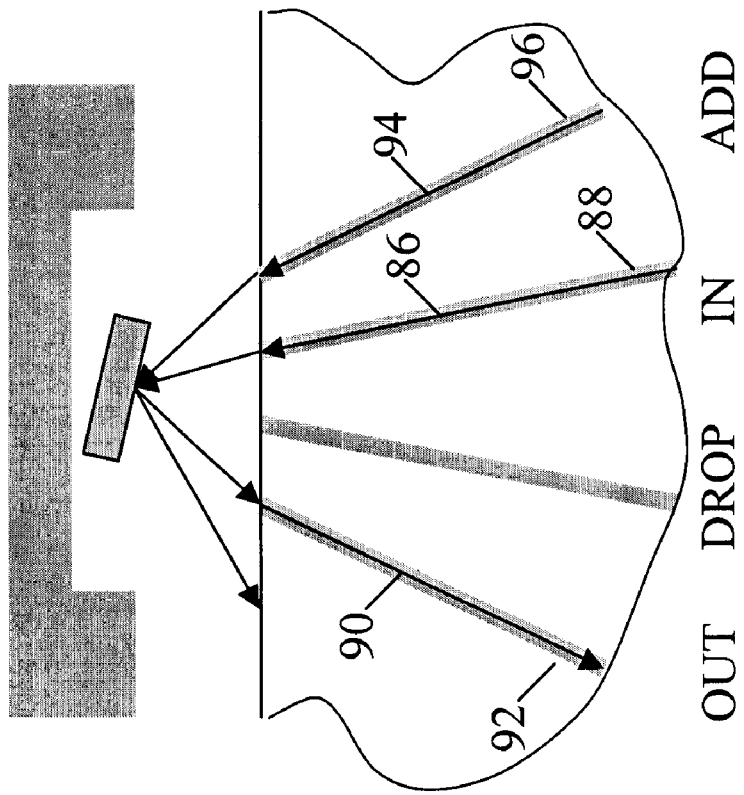
FIG. 15 shows an add-drop switch with a tilting mirror mechanism with the mirror in an add-drop state.
Figure 17:
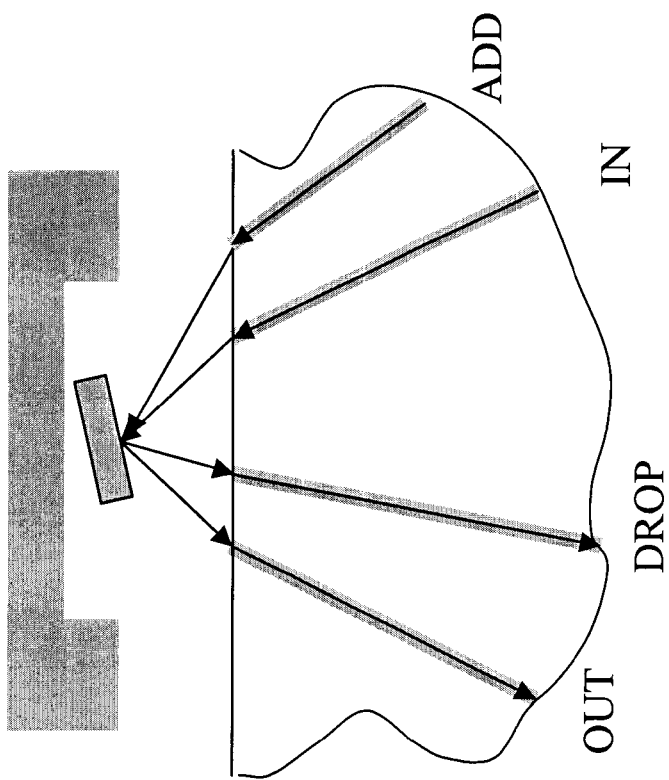
FIG. 17 shows another add-drop switch with a tilting mirror mechanism with the mirror in an add-drop state.
Figure 16:
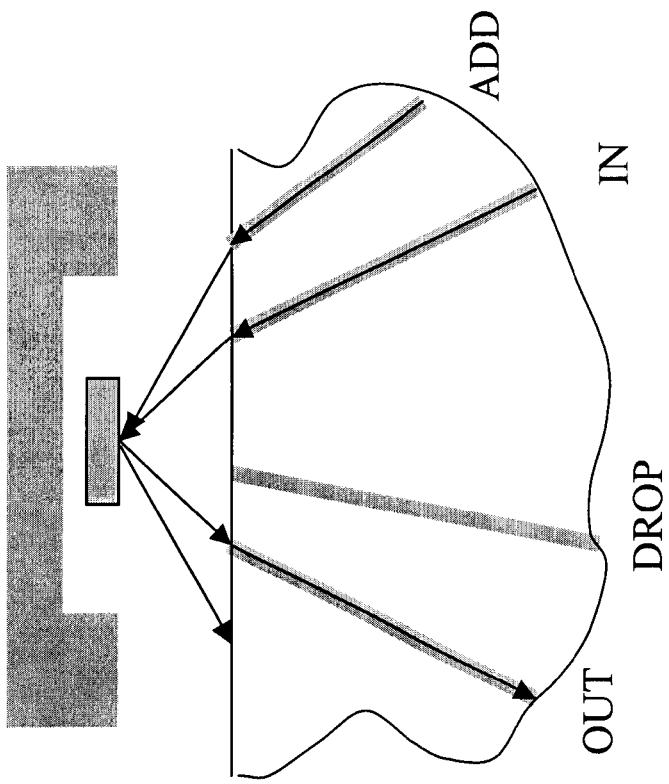
FIG. 16 shows another add-drop switch with a tilting mirror mechanism with the mirror in a pass-through state.

FIGS. 14–19 illustrate an add-drop 2×2 switch. The mirror tilt version is depicted in the pass-through state of the add-drop switch in FIG. 14, where input beam 86 in input waveguide 88 is coupled by the tilted mirror to exit as output beam 90 in output waveguide 92. Any add beam 94 in the add waveguide 96 is deflected by the tilted mirror away from the waveguides. The add-drop state is depicted in FIG. 15 where the input beam 86 is directed by the untilted mirror to the drop waveguide 98 while the add beam 94 is simultaneously directed to the output waveguide 92. Sometimes it is desirable to have the untilted (presumably also unpowered) state of the mirror in the pass-through state instead of the add-drop state. This could be accomplished by an asymmetrical shift of the waveguide pattern on the waveguide substrate to accommodate the different reflected angles as depicted in FIGS. 16 and 17. The disadvantage is that the angle of the outermost waveguide would be increased.

Increased waveguide angles lead to higher angle of refraction at the wafer edge and also higher angle of incidence at the mirror, which in turn could lead to higher polarization dispersion loss (PDL). However, such polarization dispersion loss is much reduced if the wafer edge is anti-reflection coated and the mirror is high-reflection coated, which conditions are necessary for low insertion loss of the switch anyway. The ultimate constraint for the maximum waveguide angle allowed is that the light should not be total internally reflected (TIR) at the wafer edge. For a silica waveguide, the critical (TIR) angle of incidence at the wafer edge is about 43 degrees. In practice, this has to be reduced to about 33 degrees, with a maximum mirror incidence angle of about 53 degrees. The waveguide angles are dictated by the number of input and output channels in a single switch as well as the angle between the waveguide channels. The latter in turn is constrained by the crosstalk between the waveguides. Such crosstalk could be reduced to a certain extent by reducing the numerical aperture of the waveguides (e.g. by reducing the refractive index difference between the waveguide core and cladding). One consequence of the reduction of waveguide numerical aperture is increased bending loss and mode mismatch with fibers. Some tradeoff between crosstalk and numerical aperture-induced loss has to be made which ultimately limits the number of input and output waveguide channel counts.

Figures 18, 19:
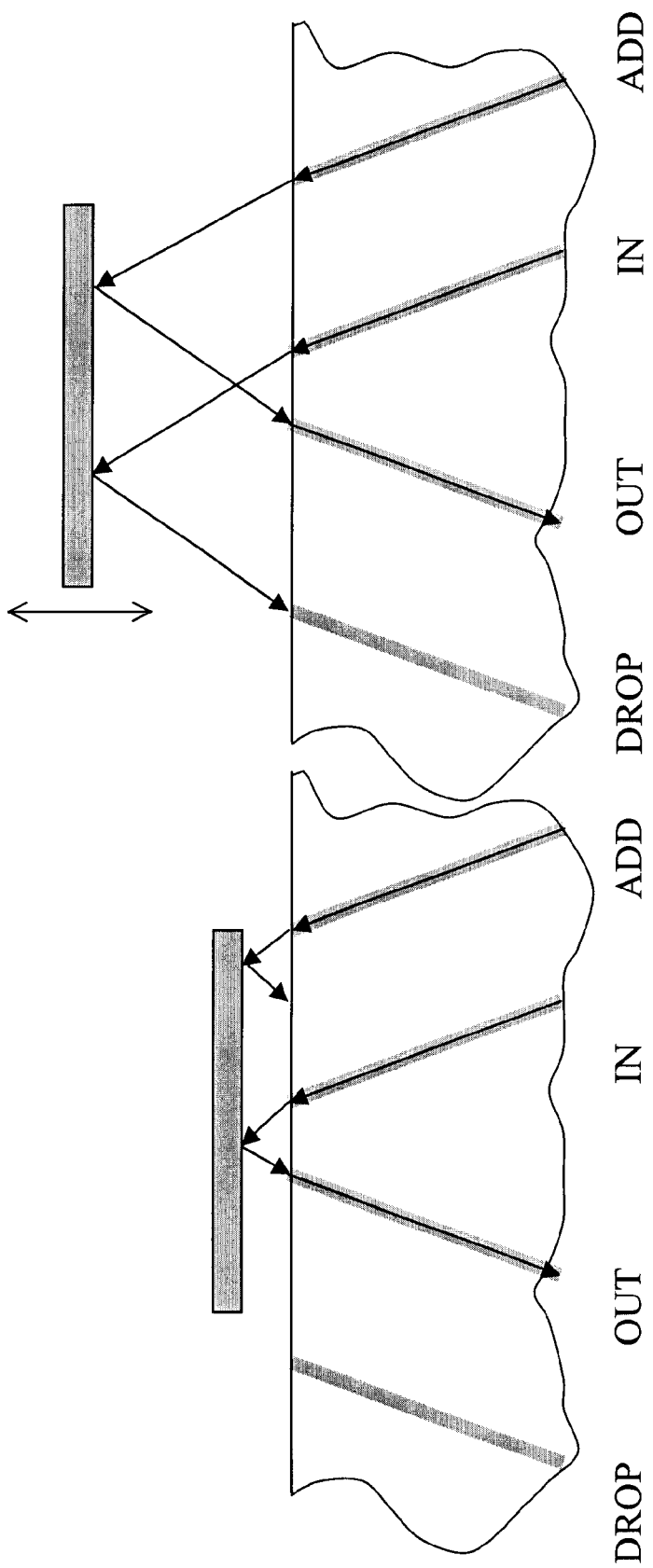
FIG. 18 shows an add-drop switch with a mirror translation mechanism with the mirror in a pass-through state.
FIG. 19 shows an add-drop switch having a mirror translation mechanism with the mirror in an add-drop state.

This constraint is somewhat relieved in the alternate mirror translation implementation of the switch, as depicted in FIGS. 18 and 19 using notations in common with the earlier illustrations. The maximum waveguide angle is fixed with input and output channel count, instead of increasing with it. The drawback is that the range of mirror translation increases with each pair of input/output channels added.

Figure 20:
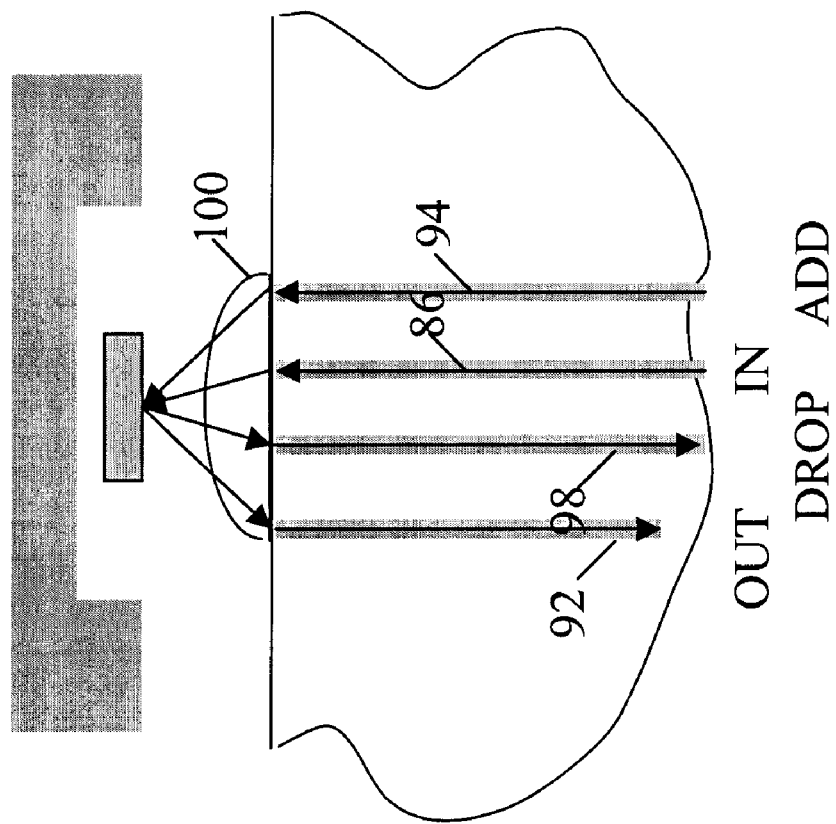
FIG. 20 shows an add-drop switch with parallel waveguides, a refracting lens and a tilting mirror mechanism with the mirror in a pass-through state.
Figure 21:
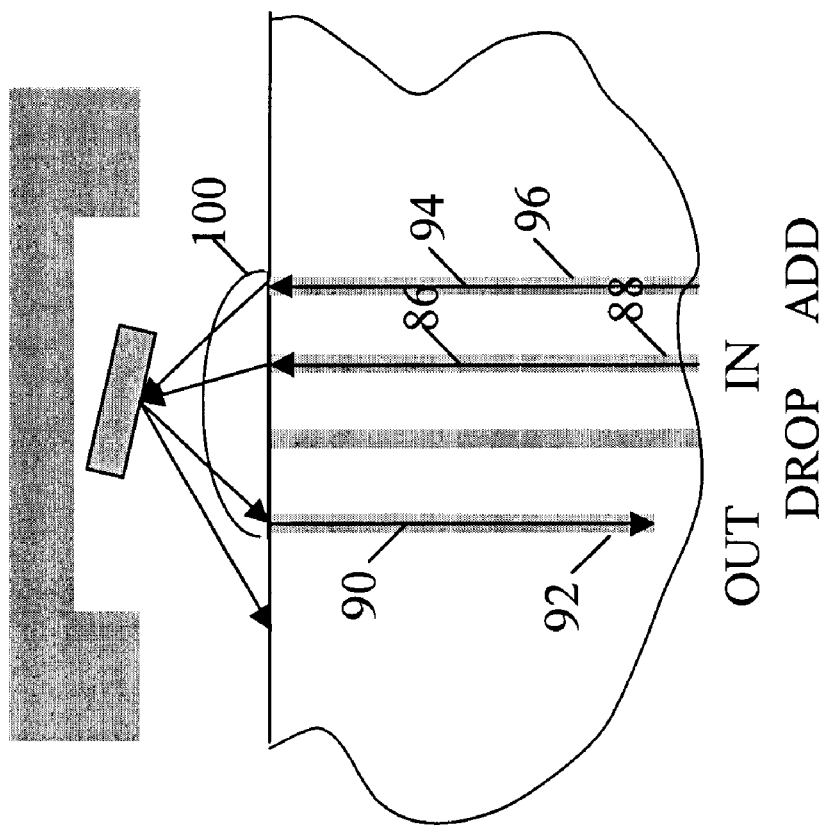
FIG. 21 shows an add-drop switch with parallel waveguides, a refracting lens and a tilting mirror mechanism with the mirror in an add-drop state.
Figure 23:
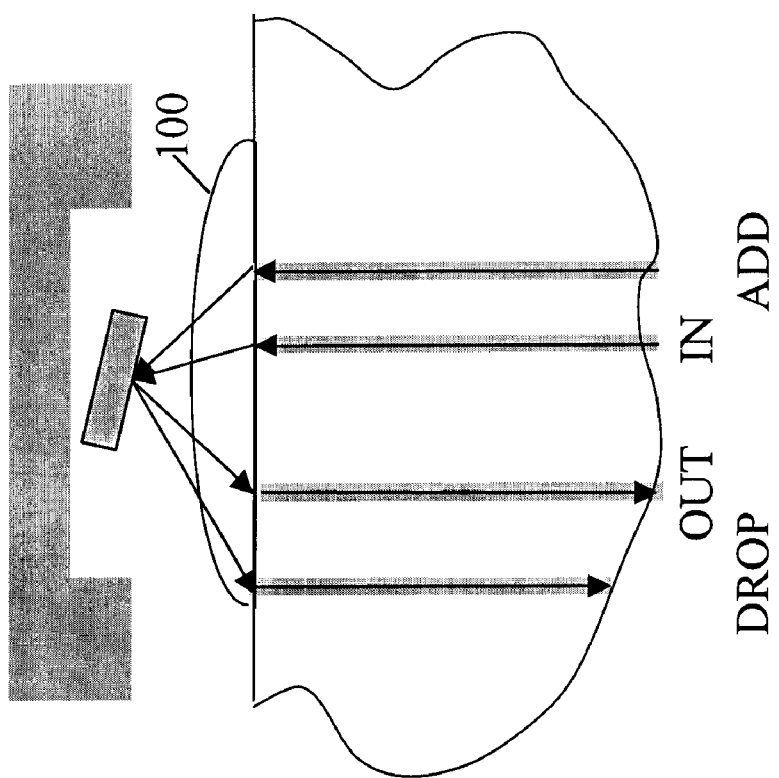
FIG. 23 shows another add-drop switch with parallel waveguides, a refracting lens and a tilting mirror mechanism with the mirror in an add-drop state.
Figure 22:
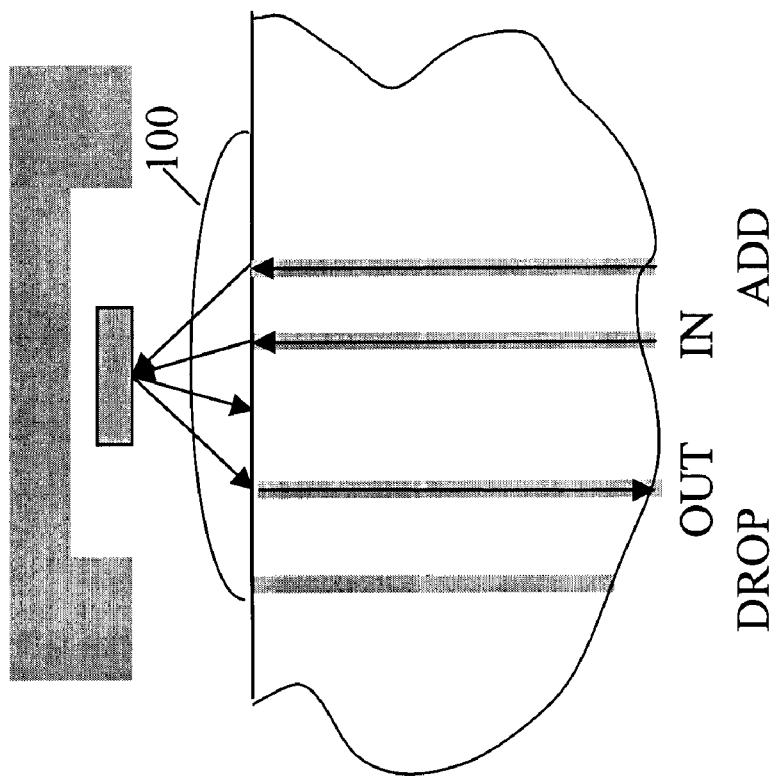
FIG. 22 shows another add-drop switch with parallel waveguides, a refracting lens and a tilting mirror mechanism with the mirror in a pass-through state.

FIGS. 20 and 21 show a variation including a focusing lens 100 on the edge of the substrate, with the waveguide channels arranged parallel to one another within the substrate. The lens 100 acts to bend the beams as well as collimate them. This configuration allows the number of waveguide channels that can be switched with a single mirror to be increased. To make the untilted mirror the pass-through state, the waveguides just have to be spaced differently as depicted in FIGS. 22 and 23. The position and aspheric correction of the lens have to be tailored in each configuration for the optical parameters used.

Figure 24:
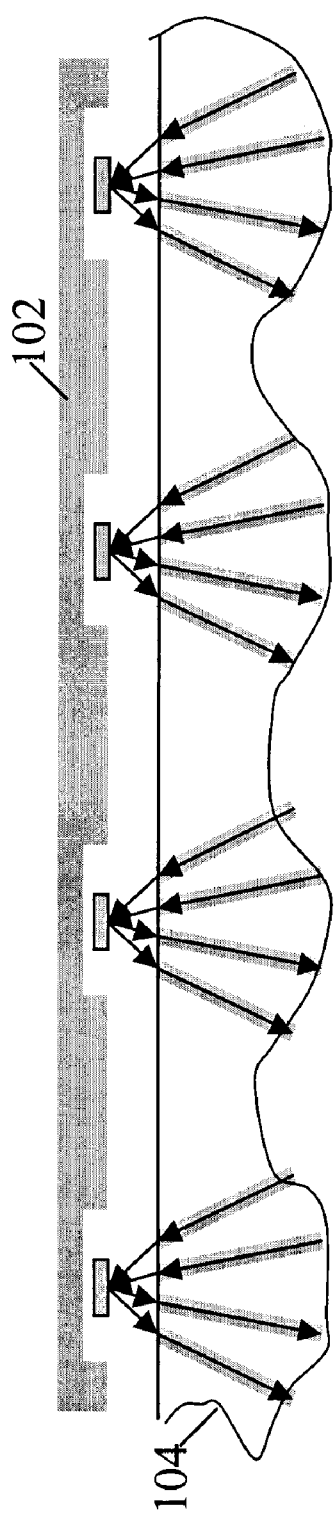
FIG. 24 shows an example of a 2×2×4 add-drop array switch in plan view.
Figure 25:
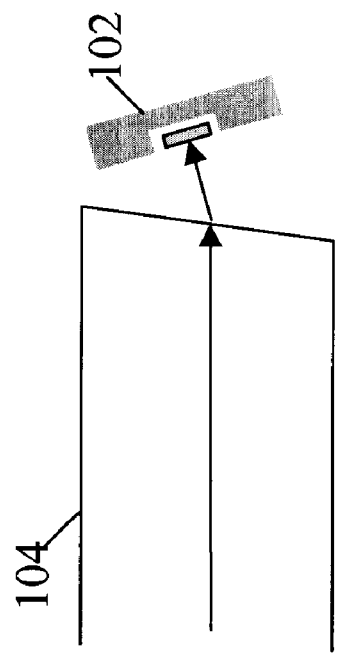
FIG. 25 shows an example of a 2×2×4 add-drop array switch in side view.

FIG. 24 shows a linear array of single switches and, in particular, shows a linear array of add-drop switches as an example. The formation of planar waveguides and MEMS mirrors on silicon substrates using conventional photolithography, masking and etching methods could easily attain the requisite registration between the waveguides and the mirrors as well as maintain the tight positional and angular tolerances across the array. Here the MEMS mirror substrate 102 is attached to the edge of the waveguide subwafer 104 via spacers (not shown) that controls the angle and separation of the two subwafers. An edge view is shown in FIG. 25.

Figure 26:
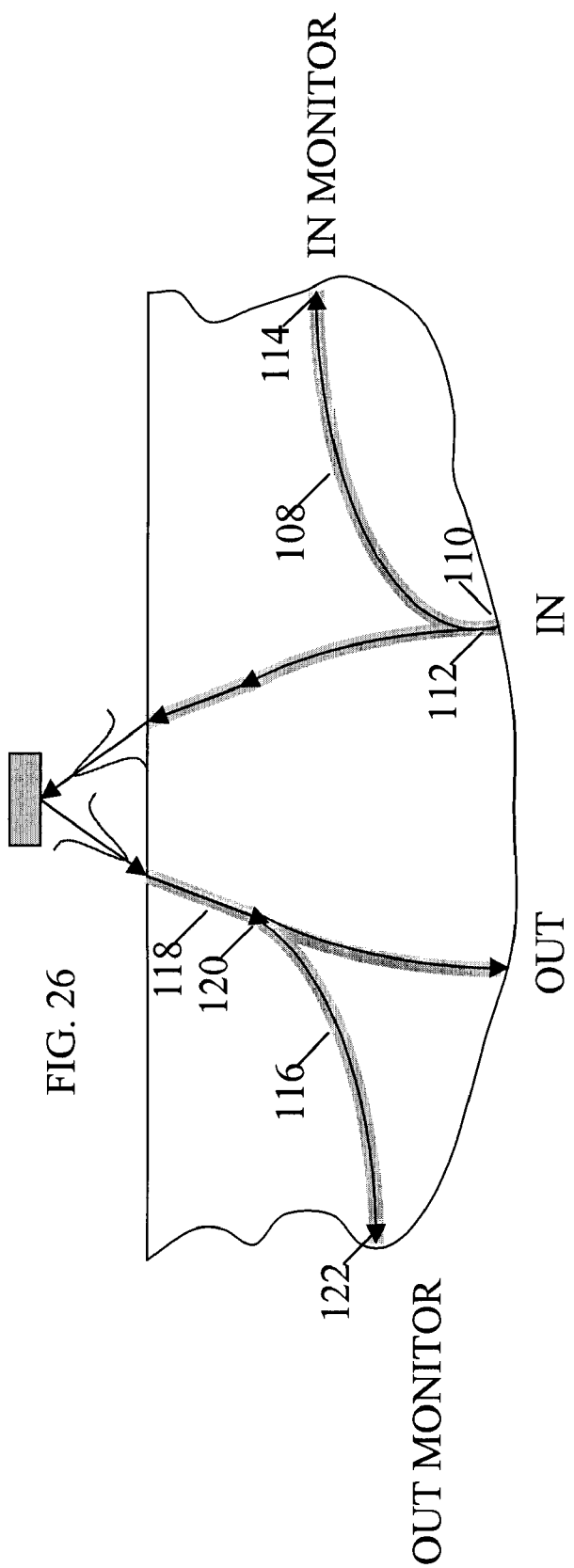
FIG. 26 shows intensity monitor branches connected to the input and output channels of a switch.

FIG. 26 shows tap branches provided for the input and output channels of a switch, using the variable optical attenuator switch of FIGS. 5–7 as an example. Here an input-monitor waveguide 108 branches at a shallow angle, about 7–11 degrees, from the input waveguide 110 so that a small fraction of the input beam 112 is tapped off into the input monitor beam 114. Similarly, an output monitor waveguide 116 branches off from the output waveguide 118, tapping off a small fraction of the output beam 120 into the output monitor 122. In an array, the input and output monitors could be routed and brought to the edge of the waveguide substrate in separate groups to be directly interfaced with array photodetectors. The optical switches described here could be operated in either the open or closed loop mode. In the open loop mode, a predetermined voltage is applied to the MEMS mirror to effect a fixed tilt or translation for switching after the tilt-to-voltage or translation-to-voltage conversion factor has been calibrated. In the electrical closed loop mode, the position of the MEMS mirror could be sensed capacititively and held at a fixed position under servo control. In the fully optical closed loop mode, the intensities of the input and output beams are monitored via the tap ports and the mirror position is adjusted to effect a certain output level.

Figure 27:
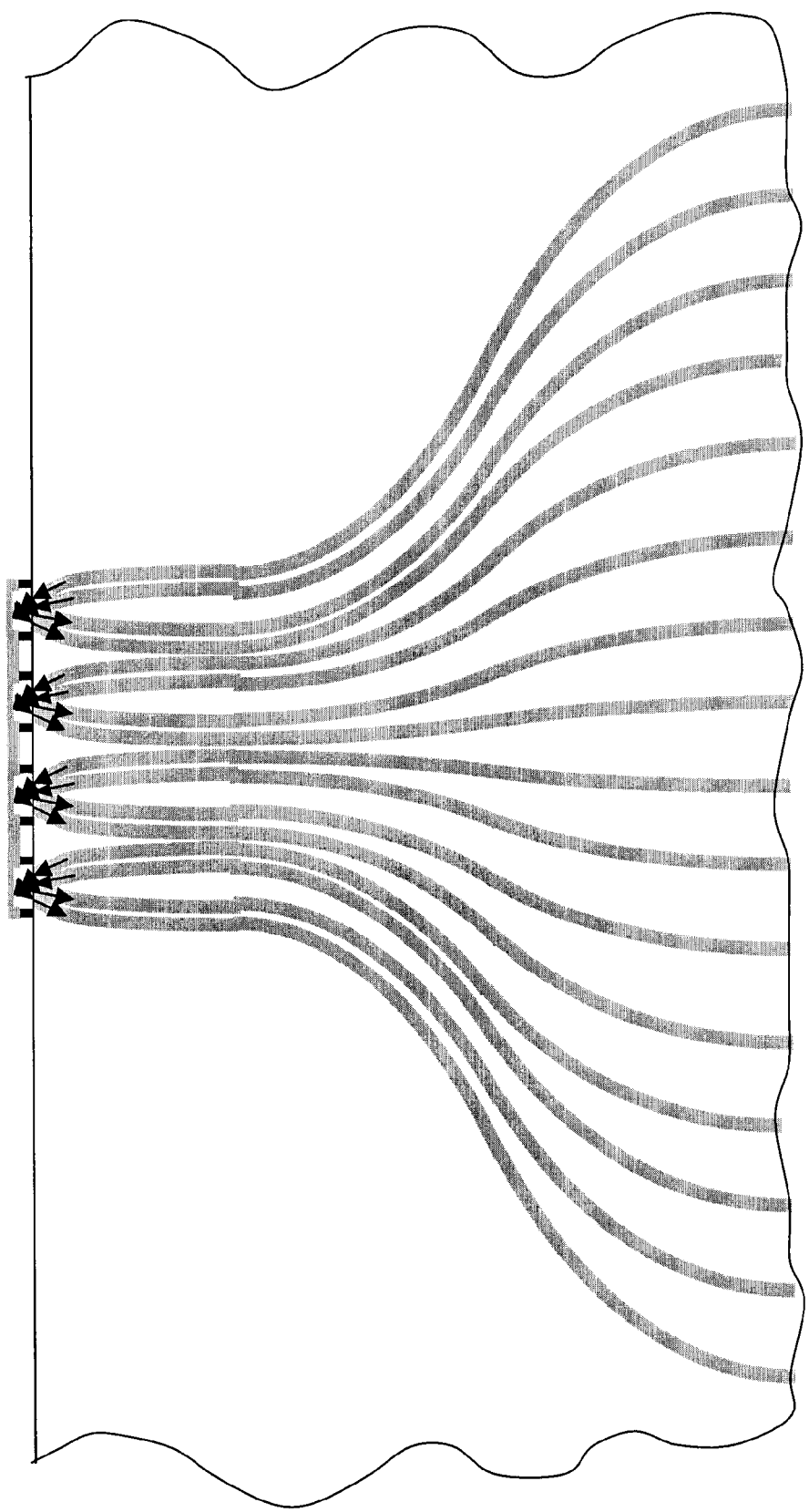
FIG. 27 illustrates how the pitch of waveguides can be varied from the end of a substrate that interfaces with a fiber array to another end of the substrate interacting with a mirror array.
Figure 28:
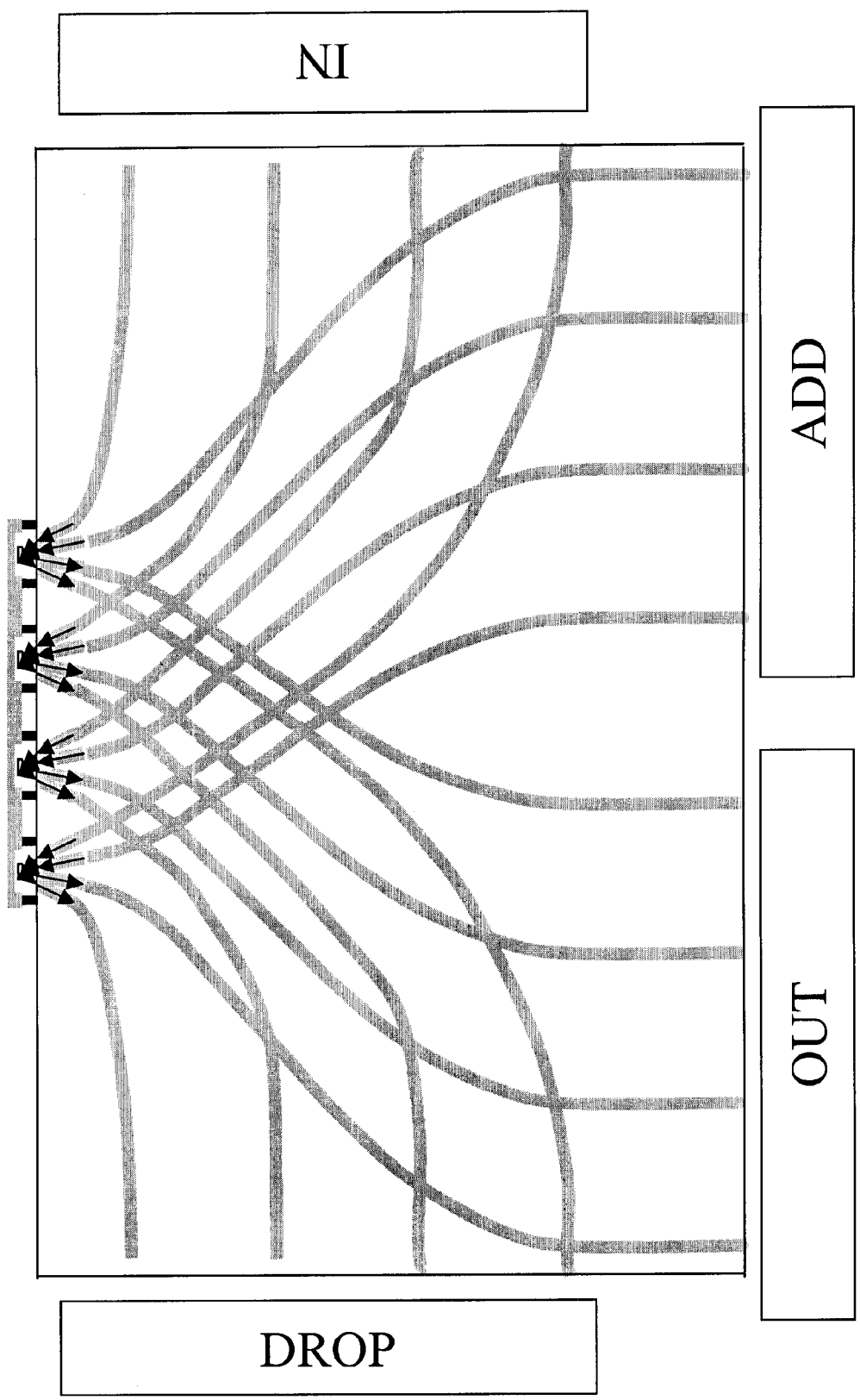
FIG. 28 illustrates how the waveguides can be grouped and routed to an edge of the substrate for convenient interfacing with a fiber array or photodetector array.

Since intersecting planar waveguides have very low crosstalk and loss as long as the intersecting angle is large enough, usually above about 20 degrees, the various waveguides in the switch array could be routed and grouped in different ways for the convenience of interfacing with fiber arrays. That fiber arrays are usually pitched at the fiber jacket diameter, about 250 micrometers, does not constrain the pitch of the array switches. The waveguide array could have a wider pitch near the fiber array and be concentrated to a lower pitch near the edge of the waveguide substrate adjacent to the mirror array, as illustrated in FIG. 27. This arrangement is possible as long as the bending radii are kept large enough, about 5 mm or so, to minimize bending loss through the walls of the waveguides. Alternately, the waveguides could be grouped and routed to the wafer's edge according to their sources or destinations as illustrated in FIG. 28 for convenient interface with fiber arrays.

Finally, since the linear array switch essentially is a planar structure, the channel count could be further scaled up by stacking the wafers on top of each other as illustrated by FIG. 29.

Again, the various embodiments described above could be used singly or jointly in different combinations.

In summary, optical switches and variable optical attenuators are formed with planar waveguides and one or more MEMS mirrors without collimating the light beam between input and output channels by positioning the optical ports and mirror close together. It is particularly convenient for the waveguides to be formed in a silicon substrate and for the MEMS mirrors to be formed in a silicon substrate. Switching is effected either by mirror tilt or translation. Variable attenuation is built-in to this switch architecture with mirror tilt or translation adjustment. The single switch is readily scaled to a linear array by repeating the single switch pattern on the same waveguide and MEMS wafers. Further scaling into a two dimensional array switch is done with stacking the linear array wafers on top of each other. Tapping channels could be included with the input and output waveguides to allow light intensity monitor. Planar waveguides could be grouped and routed to the wafer edge for convenient interface with fiber arrays. The particular case of the 2×2 switch array could be used as an optical add-drop multiplex when combined with wavelength multiplex/demultiplexer components.

Although the present invention has been described in detail with reference only to the presently preferred embodiments, those of ordinary skill in the art will appreciate that various modifications can be made without departing from the invention. Accordingly, the invention is not to be limited to any of the described embodiments thereof but is instead defined by the following claims.

What is claimed:

1. An optical component comprising:
    a waveguide substrate having an edge and having at least two sets of first and second waveguides formed within the waveguide substrate, the first waveguides having first ends the second waveguides having second ends; and
    an array of mirrors on a separate substrate rigidly fixed adjacent to but spaced from the edge of the waveguide substrate, first and second mirrors within the array positioned to each receive an optical signal from the first end of a corresponding first waveguide and independently direct the optical signal to the second end of a corresponding second waveguide in at least one position of the corresponding one of the first and second mirrors,
    wherein the first and second mirrors are independently movable to independently alter an amount of coupling between the corresponding first and second waveguides.

2. The component of claim 1, further comprising at least two third waveguides in the waveguide substrate each having a third end, the third waveguides corresponding to each of the first waveguides, wherein each of the first and second mirrors has at least one position where the optical signal from the first end is directed to the third end to couple the optical signal into the corresponding third waveguide.

3. The component of claim 2, wherein each of the first and second mirrors has a first position in which the optical signal couples into the corresponding second waveguide and each of the first and second mirrors has a second position in which the optical signal couples into the corresponding third waveguide.

4. The component of claim 3, wherein each of the first, second and third ends are at the edge of the waveguide substrate.

5. The component of claim 3, wherein each of the mirrors is movable by rotation to switch between coupling the optical signal from the corresponding first waveguide to the corresponding second waveguide and to the corresponding third waveguide.

6. The component of claim 3, wherein each of the mirrors is movable by linear translation to switch between coupling the optical signal from the corresponding first waveguide to the corresponding second waveguide and to the corresponding third waveguide.

7. The component of claim 1, wherein for each of the mirrors the amount of coupling is actively controlled to achieve a desired level of attenuation in the corresponding optical signal.

8. The component of claim 7, wherein each of the mirrors is movable by rotation to alter the amount of coupling between the corresponding first waveguide and the corresponding second waveguide.

9. The component of claim 7, wherein each of the mirrors is movable by linear translation to alter the amount of coupling between the corresponding first waveguide and the corresponding second waveguide.

10. The component of claim 1, wherein each of the mirrors is movable by translation in a direction non-parallel to the edge of the waveguide substrate.

11. The component of claim 1, wherein the array of mirrors is a MEMS element formed in a semiconductor substrate.

12. The component of claim 11, wherein the waveguide substrate is a semiconductor or glass and the waveguides are formed by lithography.

13. An optical component comprising:
    a waveguide substrate having an edge and having at least two sets of first, second and third planar waveguides extending within the waveguide substrate, each of the first, second and third waveguides having an optical path extending through the edge of the waveguide; and
    an array of mirrors on a separate substrate rigidly positioned adjacent to but spaced from the edge of the waveguide substrate, the array receiving an optical signal output from each corresponding first waveguide and independently directing each corresponding optical signal to each corresponding second waveguide in at least a first position of a corresponding mirror of the array, the corresponding mirror receiving and directing the corresponding optical signal to a corresponding third waveguide in at least a second position of the corresponding mirror,
    wherein the corresponding mirror is movable to couple the corresponding first waveguide either to the corresponding second waveguide or to the corresponding third waveguide.

14. The component of claim 13, wherein the at least two sets of the first, second and third waveguides each have ends at the edge of the waveguide substrate.

15. The component of claim 13, wherein each corresponding mirror of the array is independently movable by rotation to switch between coupling the corresponding optical signal to the corresponding second waveguide and to the corresponding third waveguide.

16. The component of claim 15, wherein for each mirror of the array the amount of coupling is actively controlled to achieve a desired level of attenuation in the optical signal.

17. The component of claim 13, wherein each mirror of the array is independently movable by linear translation to switch between coupling the corresponding optical signal from the corresponding first waveguide to the corresponding second waveguide and to the corresponding third waveguide.

18. The component of claim 13, wherein each mirror of the array is independently movable by translation in a direction non-parallel to the edge of the waveguide substrate.

19. The component of claim 13, wherein the array is a MEMS element formed in a semiconductor substrate.

20. The component of claim 13, wherein the waveguide substrate is a semiconductor or glass and the waveguides are formed by lithography.

21. An optical component comprising:
a waveguide substrate having an edge and having first, second, third and fourth planar waveguides extending within the waveguide substrate, each of the first, second, third and fourth waveguides having an optical path extending through the edge of the waveguide; and
a mirror positioned adjacent to the edge of the waveguide substrate, the mirror spaced from the edge of waveguide substrate and receiving a first optical signal output from the first waveguide and directing the first optical signal to the third waveguide in at least a first position of the mirror, the mirror receiving the first optical signal and directing the first optical signal to the fourth waveguide in at least a second position of the mirror,
the mirror receiving a second optical signal output from the second waveguide and directing the second optical signal to the third waveguide in at least the second position of the mirror, and
wherein the mirror is movable to couple the first optical signal to the third waveguide or to the fourth waveguide.

22. The component of claim 21, wherein the first, second, third and fourth waveguides each have openings aligned with the edge of the waveguide substrate.

23. The component of claim 21, wherein the mirror is movable by rotation to switch between coupling the first optical signal to the third waveguide and to the fourth waveguide.

24. The component of claim 23, wherein the amount of coupling is adjusted to achieve a desired level of attenuation in the optical signal.

25. The component of claim 21, wherein the mirror is movable by linear translation to switch between coupling the first optical signal to the third waveguide and to the fourth waveguide.

26. The component of claim 21, wherein the mirror is movable by translation in a direction non-parallel to the edge of the waveguide substrate.

27. The component of claim 21, wherein the mirror is a MEMS element formed in a semiconductor substrate.

28. The component of claim 21, wherein the waveguide substrate is a semiconductor or glass and the waveguides are formed by lithography.

29. An optical component comprising:
a waveguide substrate having an edge and having a plurality of sets of first, second third and fourth planar waveguides extending within the waveguide substrate, each of the first, second third and fourth waveguides having an optical path extending through the edge of the waveguide substrate; and
an array of mirrors on a separate substrate mounted to the edge of the waveguide substrate, the array spaced from the edge of waveguide substrate and having independent mirrors positioned to each receive an optical signal output from a corresponding first waveguide and direct the optical signal to a corresponding second waveguide in at least a first position of the mirror, the mirror receiving the optical signal and directing the optical signal to a corresponding third waveguide in at least a second position of the mirror,
wherein the mirror is movable to optically couple the corresponding first waveguide either to the corresponding second waveguide or to the corresponding third waveguide and the mirror is movable optically couple a corresponding fourth waveguide to at least one of the corresponding second and third waveguides.

30. An optical component comprising:
a waveguide substrate having an edge and having first, second, third and fourth planar waveguides extending within the waveguide substrate, each of the first, second, third and fourth waveguides having an optical path extending through the edge of the waveguide;
a lens positioned within the optical path of each of the first, second, third and fourth planar waveguides; and
a mirror positioned adjacent to the edge of the waveguide substrate, the mirror spaced from the edge of waveguide substrate and receiving a first optical signal output from the first waveguide and directing the first optical signal to the third waveguide in at least a first position of the mirror, the mirror receiving the first optical signal and directing the first optical signal to the fourth waveguide in at least a second position of the mirror,
the mirror receiving a second optical signal output from the second waveguide and directing the second optical signal to the third waveguide in at least the second position of the mirror, and
wherein the mirror is movable to couple the first optical signal to the third waveguide or to the fourth waveguide.

* * * * *